(12) United States Patent
Goddard

(10) Patent No.: US 6,371,500 B1
(45) Date of Patent: Apr. 16, 2002

(54) CAM MECHANISM FOR AN ADJUSTABLE WHEEL MOUNTING ASSEMBLY

(75) Inventor: Steven Gray Goddard, Fort Wayne, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 0 days.

(21) Appl. No.: 09/649,087

(22) Filed: Aug. 28, 2000

(51) Int. Cl.$^7$ .................................................. B60G 7/02
(52) U.S. Cl. ............................. 280/86.754; 280/86.756
(58) Field of Search ........................ 280/86.751, 86.752, 280/86.754, 86.755, 86.756, 93.512, 124.125

(56) References Cited

U.S. PATENT DOCUMENTS

| | | | |
|---|---|---|---|
| 2,544,331 A | | 3/1951 | Kogstrom |
| 3,147,025 A | | 9/1964 | Good |
| 4,026,578 A | * | 5/1977 | Mattson .................. 280/86.754 |
| 4,519,626 A | | 5/1985 | Murphy |
| 4,706,987 A | | 11/1987 | Pettibone |
| 4,921,271 A | * | 5/1990 | Berry et al. ............ 280/86.756 |
| 5,538,273 A | * | 7/1996 | Osenbaugh et al. ... 280/86.756 |
| 5,931,485 A | | 8/1999 | Moddinger et al. |
| 6,176,501 B1 | * | 1/2001 | Bartolone .............. 280/86.756 |

* cited by examiner

Primary Examiner—J. J. Swann
Assistant Examiner—David R. Dunn
(74) Attorney, Agent, or Firm—Liniak, Berenato, Longacre & White

(57) ABSTRACT

An adjustable mounting assembly for a steerable wheel assembly. A cam member is rotatably disposed within a recess formed in the lower arm of a yoke assembly. An eccentric cylinder of the cam member extends within a vertically oriented slot formed in a ball joint forging which is in turn adjustable secured to the lower arm of the yoke. By simply rotating the cam member, the eccentric cylinder engages the slot and moves the ball joint forging in a horizontal direction to adjust the caster of the wheel assembly. The vertical slot in the ball joint forging prevents vertical movement to facilitate adjustment of the caster without affecting a camber setting, the distance between the upper and lower ball joints, or ball joint pre-loading. Horizontal slots are formed in the lower arm to align with boltholes formed in the ball joint forging to allow the forging to be bolted to the lower arm over a range of horizontal positions. A method of adjusting the camber of the wheel assembly is also disclosed.

14 Claims, 2 Drawing Sheets

CAM MECHANISM FOR AN ADJUSTABLE WHEEL MOUNTING ASSEMBLY

BACKGROUND OF THE INVENTION

1. Field of the Invention

The present invention relates to cam mechanism to adjust a wheel assembly and more particularly to a cam member to adjust the caster of a steerable wheel assembly.

2. Background of the Related Art

Ball joints have long been used in automobiles to provide for rotatable motion between the spindle and control arms of a motor vehicle. Adjustments are often needed between the spindle and control arms to provide for the proper camber and caster. One of the more common ways of providing this adjustment is to provide an eccentric member which, when rotated, changes the relative position of the spindle with respect to the control arms. In another known construction, the ball joint has a ball stud with an eccentric shank which when rotated relatively moves the eccentric shank and its connected arm with respect to the ball and its connected arm.

In addition, another common way to provide adjustment is with a sleeve surrounding the ball stud having an eccentrically placed hole extending therethrough. When the sleeve is rotated, it adjustably positions the ball stud. Numerous other deficient ways to adjust caster are also known within the arts.

The problems with the prior art designs are that caster can not be adjusted without also affecting the camber, distance between upper and lower ball joints, or the pre-load of the ball joints. In addition the range of adjustment is limited and the assembly and method of adjustment is not simple. It is desirous to have an adjustment device that easily allows varied caster adjustment within a range without affecting camber and sets and holds the position of the ball joint forging while adjusting the caster angle of the wheel end.

SUMMARY OF THE INVENTION

The present invention alleviates the drawbacks of the related art. An adjustable mounting assembly for a steerable wheel assembly has a cam member rotatably disposed within a recess formed in the lower arm of a yoke assembly.

An eccentric cylinder of the cam member extends within a vertically oriented slot formed in a ball joint forging which is in turn adjustable secured to the lower arm of the yoke. By simply rotating the cam member, the eccentric cylinder engages the slot and moves the ball joint forging in a horizontal direction to adjust the caster of the wheel assembly. The vertical slot in the ball joint forging prevents vertical movement to facilitate adjustment of the caster without affecting a camber setting, the distance between the upper and lower ball joints, or ball joint pre-loading. Horizontal slots are formed in the lower arm to align with boltholes formed in the ball joint forging to allow the ball joint forging to be bolted to the lower arm over a range of horizontal positions. A method of adjusting the caster of the wheel assembly is also disclosed. The present arrangement and method allows varied caster adjustment within a range without affecting camber and maintains the position of the ball joint forging while adjusting the caster angle of the wheel end during assembly.

Other objects and advantages of the invention will become apparent from a study of the following specification when viewed in light of the accompanying drawings.

DETAILED DESCRIPTION OF THE PREFERRED EMBODIMENT

Figure 1:
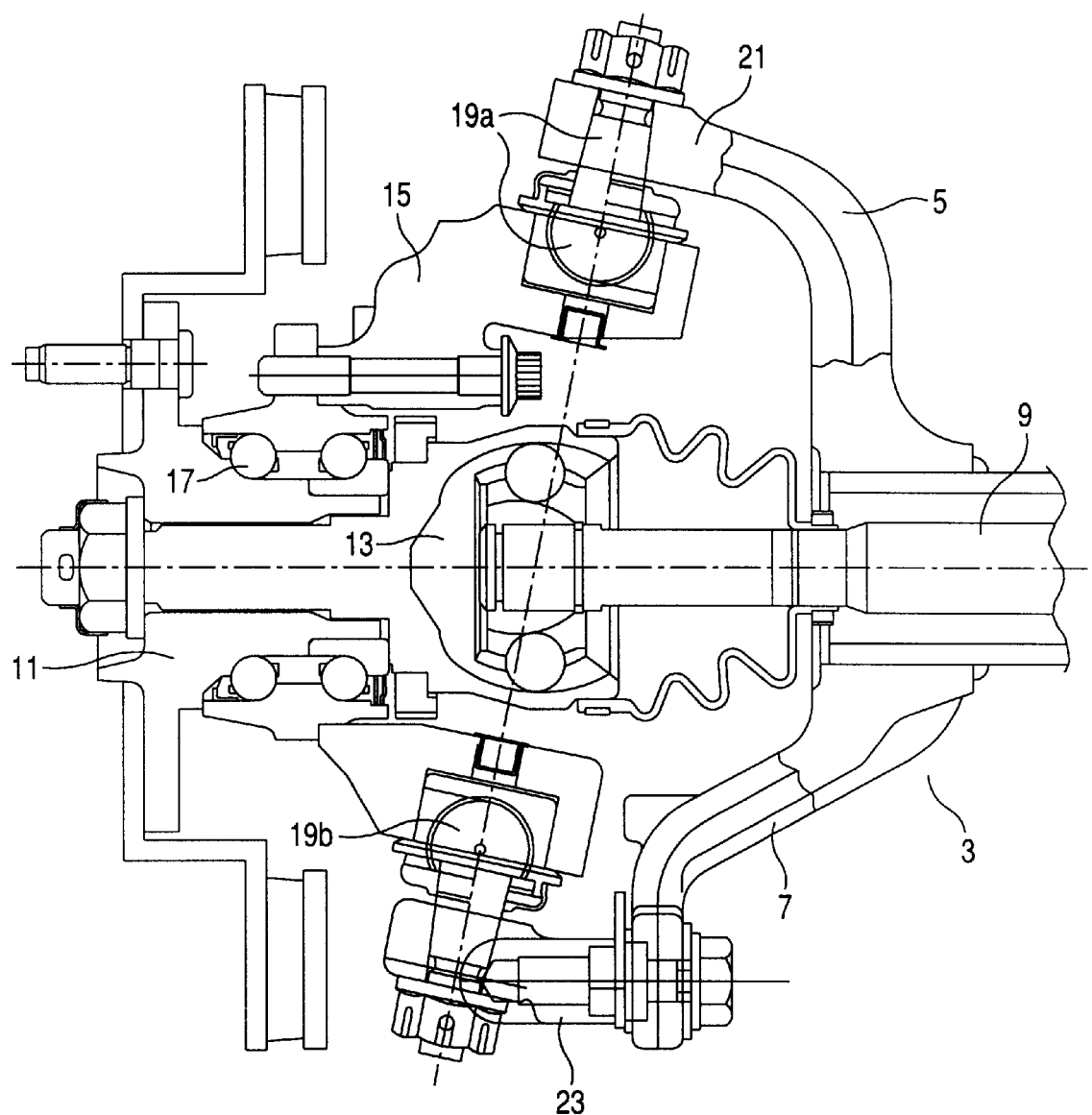
FIG. 1 is a sectional view of a steerable wheel suspension system incorporating the adjustment cam mechanism of the present invention.

FIG. 1 depicts an entire steerable wheel end assembly. A yoke 3 having an upper arm 5 and a lower arm 7 is secured to a vehicle in a conventional manner (not shown). A drive axle 9 extends through a center portion of the yoke 3 in driving connection with the wheel hub 11 through a constant velocity joint 13. The upper 5 and lower arms 7 are connected to a knuckle 15 or other member which in turn rotatably supports the hub 11 through bearings 17. The upper 5 and lower 7 arms are connected to the knuckle 15 through a pair of ball stud joints 19a, 19b.

Preferably, the upper arm 5 contains a ball joint forging 21 unitarily formed with the yoke 3 and is adapted to receive the tapered portion of the ball stud. A separate second ball joint forging 23 is adjustably secured to the lower arm 7 of the yoke 3 the details of which will be explained later.

A cam member 31 is disposed between and engages the lower arm 7 and second ball joint forging 23. The cam member 31 is arranged such that simple rotation of the cam member 31 causes the second ball joint forging 23 to move in a horizontal direction to adjust wheel caster without significantly affecting camber, the distance between upper and lower ball joints or the pre-load of the ball joints.

Figure 4:
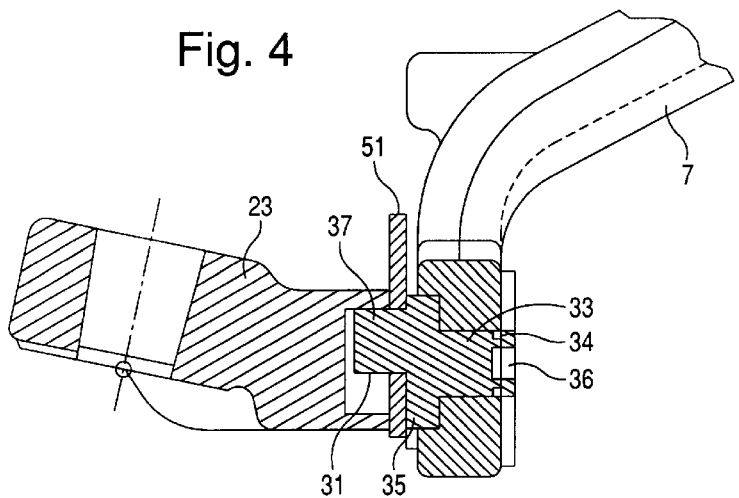
FIG. 4 is a partial sectional enlarged isolated view of cam adjustment mechanism of FIG. 1.

Referring now to FIG. 4, the cam member 31 has first 33 and second 35 cylindrical portions disposed in corresponding recesses in the lower arm 7. The first 33 and second 35 cylindrical portions have a common centerline to facilitate rotation about a common axis relative to the lower arm 7. The second cylindrical portion 35 is larger than the first cylindrical portion 33 to prevent axial movement in one direction and facilitate retention of the cam member 31 within the lower arm 7 during assembly. A seal member 41 or O-ring is disposed between the first cylindrical portion 33 and the recess of the lower arm 7 and is seated within an annular recess 34 formed in the first cylindrical member 33. The seal 41 member helps eliminate contamination between the cam member 31 and second arm 7 and may provide a frictional interface to help maintain a position of the cam member 31 relative to the second arm 7.

An eccentrically mounted cylinder portion 37 extends from the second cylindrical portion 35 and has a centerline offset from the common centerline of the first 33 and second 35 cylindrical portions. The eccentric cylindrical portion 37 extends within a vertical slot 25 formed in the second ball joint forging 23. A spacer 51 or shim is disposed between the second ball joint forging 23 and the lower arm 7 to adjust camber. When the cam member 31 is rotated, the eccentric cylindrical portion 37 engages the internal surface of the vertical slot 25 to horizontally move the second ball joint forging 23.

Figure 3:
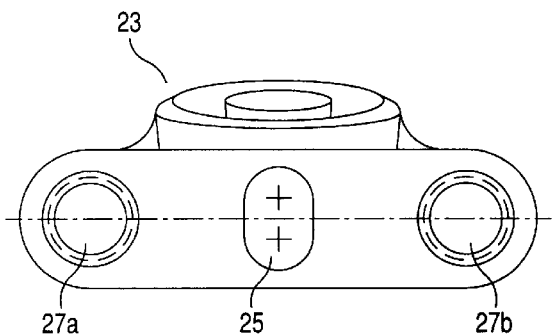
FIG. 3 is a side view of the adjustable ball joint forging of FIG. 1.

As shown in FIG. 3, the vertical slot 25 extends beyond a vertical range of displacement of the eccentric cylindrical portion 37. Thus upon rotation of the cam member 31, the second (lower) ball joint forging 23 will be displaced in the horizontal direction without significant or any displacement in the vertical direction. Thus caster can be adjusted without affecting camber or other characteristics of the wheel assembly.

To facilitate rotation of the cam member 31, a tool engaging surface 36 is formed on an exposed end of the first cylindrical portion 31. In the preferred embodiment the engaging surface 36 is in the form of a multi-faceted recess adapted to receive and engage an Allen-type wrench. However, other types of tool engagement surfaces such as flat and Phillips head slots to engage a screwdriver or a bolt head to engage a socket, box or open engaged conventional wrench may also be employed and are contemplated by the present invention.

Figure 2A:
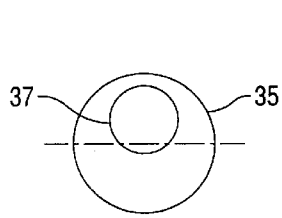
FIGS. 2A, 2B, 2C are front, side sectional, and rear views of the cam member of FIG. 1.
Figure 2B:
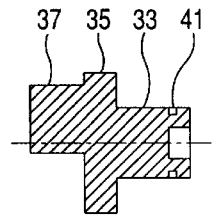
Figure 2C:
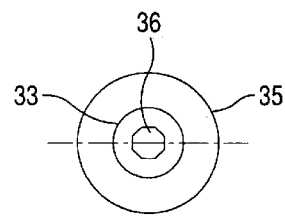

FIGS. 2A, 2B, 2C represent front side sectional and rear views of the cam member 31. As is clearly shown, the eccentric cylindrical member 37 is offset from the centerline of the remaining portions of the cam member 31. The cam member 31 is preferably formed of a unitary piece of metal, such as steel, but may be formed of other suitable material which will displace the lower ball joint forging 23 without significant wear.

Figure 5:
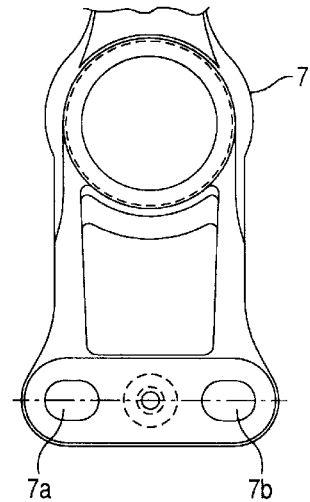
FIG. 5 is a side view of the bottom portion of the yoke of FIG. 1.

Referring to FIG. 3, the second ball joint forging 23 has a pair of boltholes 27a, 27b on opposite sides of the vertical slot 25 for receiving a pair of bolts to connect to the lower arm 7. As can be seen in FIG. 5, the lower arm 7 has a pair of corresponding horizontally extending slots 7a, 7b adapted to receive bolts to allow the second ball joint forging 23 to be adjustably bolted to the lower arm 7. The pair of slots 7a, 7b horizontally extend sufficiently to allow the second ball joint forging 23 its full horizontal range of displacement as the cam member 31 is rotated. Such an arrangement allows for the second ball joint forging 23 to be loosely connected to the lower arm 7 while adjusting the wheel caster. Once the adjustment has been made and the wheel assembly is in the proper position the bolts are simply tightened and the ball joint forging 23 and lower arm 7 are securely connected.

The method of adjusting the caster of the wheel assembly is simple. The cam member 31 is simply inserted within the bore of the lower arm 7. The second ball joint forging 23 is loosely connected to the lower arm 7 by inserting a pair of bolts through the bolt holes 27a, 27b and horizontal slots 7a, 7b of the lower arm 7. The bolts are loosely tightened. The remainder of the wheel assembly is arranged as shown in FIG. 1. The particular steps of assembling the components of FIG. 1 will not be explained in detail and are apparent to one of ordinary skill in the art from view FIG. 1. A tool is used to engage the exposed end 36 of the cam member 31 to rotate the cam member 31 and move second ball joint forging 23 to a desired position to achieve a specific wheel end caster. Once the desired position and caster is obtained, the bolts are simply tightened and the connection between the second ball joint forging 23 and the lower arm 7 is firmly secured. The arrangement of the present invention provides a simple means to adjust wheel end caster without affecting camber or other wheel end characteristics. Moreover, the present invention provides the ability to develop and set identical caster setting for both right and left hand wheel ends to reduce cross-caster problems.

While the foregoing invention has been shown and described with reference to a preferred embodiment, it will be understood by those possessing skill in the art that various changes and modifications may be made without departing from the spirit and scope of the invention. Fore example, while the preferred embodiment preferably disposed the cam member between the lower arm and the lower ball joint forging, such a cam member can be disposed between the upper arm and upper ball joint forging.

What is claimed is:

1. An adjustable mounting assembly for a steerable wheel assembly comprising:
    a yoke having an upper arm and a lower arm;
    a first ball joint forging secured to one of said upper and lower arms of said yoke;
    a second ball joint forging adjustably secured to the other of said upper and lower arms of said yoke;
    a separate cam member rotatably disposed in said other arm of said yoke and having an eccentric cylinder disposed in a slot formed in said second ball joint forging whereupon rotation of said cam member, said second ball joint is adjusted substantially in one direction; and
    at least one bolt connecting said second ball joint to said other arm of said yoke, said bolt extending through a second slot formed in said other arm, said second slot extending in said one direction to thereby allow adjustment of said second ball joint forging relative to said other arm.

2. The adjustable mounting assembly according to claim 1, said second ball joint forging has at least two bolt holes extending therethrough provided to align with at least two horizontally oriented slots formed in said other arm to allow a bolt to extend through said bolt holes and said slots to facilitate a substantially horizontally adjustable connection between said second ball joint forging and other.

3. The adjustable mounting assembly according to claim 2, wherein said second ball joint forging is secured to said lower arm.

4. The adjustable mounting assembly according to claim 3, wherein said yoke and said first ball joint forging are unitarily formed as a single forging.

5. The adjustable mounting assembly according to claim 1, wherein said slot formed in said second ball joint forging substantially extends in a vertical direction.

6. The adjustable mounting assembly according to claim 1, further comprising:
    a knuckle having an upper portion and a lower portion; and
    a pair of ball studs one each being disposed between and connecting each of said upper and lower portions of said knuckle and a corresponding one of said upper and lower arms of said yoke to form a connection between said knuckle and said yoke.

7. The adjustable mounting assembly according to claim 6, further comprising:
    a wheel hub rotatably mounted to said knuckle provided to support a steerable wheel.

8. The adjustable mounting assembly according to claim 7, further comprising:
    a drive axle rotatably mounted and extending through a center portion of said yoke and being in driving connection with said wheel hub.

9. A method of adjusting a caster of said steerable wheel assembly of claim 1, said method comprising the steps of:
    loosely connecting said second ball joint forging to said other arm to allow horizontal movement of said second ball joint forging;
    rotating said cam member to horizontally to displace said second ball joint forging to a desired position relative to said other arm; and
    securely connecting said second ball joint forging relative to said other arm to lock said second ball joint forging in said desired position relative to said other arm.

10. A adjustable mounting assembly for a steerable wheel assembly comprising:
- a yoke having an upper arm and a lower arm;
- a first ball joint forging secured to one of said upper and lower arms of said yoke;
- a second ball joint forging adjustably secured to the other of said upper and lower arms of said yoke;
- a separate cam member rotatably disposed in said other arm of said yoke and having an eccentric cylinder disposed in a slot formed in said second ball joint forging whereupon rotation of said cam member, said second ball joint is adjusted substantially in one direction; and
- at least one bolt connecting said second ball joint to said other arm of said yoke, said bolt extending through a second slot formed in said other arm, said second slot extending in said one direction to thereby allow adjustment of said second ball joint forging relative to said other arm;
- wherein said slot formed in said second ball joint forging substantially extends in a vertical direction; and
- wherein said cam member further includes;
  - a first cylindrical portion disposed within a first recessed portion formed in said other arm;
  - a second cylindrical portion extending from said first cylindrical portion and disposed within a second recess formed in said other arm to prevent axial displacement of said cam member in one direction, said second cylindrical portion having a common centerline with said first cylindrical portion and rotatable thereabout; and
  - said eccentric cylindrical portion extends from said second cylindrical portion having a second center line offset from said common centerline; wherein when said cam member is rotated about said common centerline within said other arm, said eccentric cylinder portion displaces said second ball joint forging substantially in a horizontal direction without significant displacement in said vertical direction.

11. The adjustable mounting assembly according to claim 10, further comprising a seal member disposed between said first cylindrical portion of said cam member and said first recess of said other arm and seated within an annular recess formed in said first cylindrical portion of the cam member.

12. The adjustable mounting assembly according to claim 10, wherein said first cylindrical portion has an exposed end having a tool engaging surface provided to facilitate engagement with a tool to rotate said cam member about said common centerline.

13. The adjustable mounting assembly according to claim 12, wherein said tool engaging surface is formed as a multi-faceted recess to matingly engage an allen-type wrench.

14. An adjustable mounting assembly for a steerable wheel assembly comprising:
- a yoke having an upper arm and a lower arm;
- a first ball joint forging unitarily formed with said upper arm of said yoke;
- a second ball joint forging adjustably secured to said lower lower arm of said yoke;
- a separate cam member rotatably disposed in said lower arm of said yoke and having an eccentric cylinder disposed in a vertical slot formed in said second ball joint forging whereupon rotation of said cam member said second ball joint is adjusted substantially in one direction, said cam member further having:
  - a first cylindrical portion disposed within a first recessed portion formed in said lower arm;
  - a second cylindrical portion extending from said first cylindrical portion and disposed within a second recess formed in said lower arm to prevent axial displacement of said cam member in one direction, said second cylindrical portion having a common centerline with said first cylindrical portion and rotatable thereabout;
  - said eccentric cylindrical portion extends from said second cylindrical portion having a second centerline offset from said common centerline; wherein when said cam member is rotated about said common centerline within said lower arm, said eccentric cylinder portion displaces said second ball joint forging substantially in a horizontal direction without significant displacement in said vertical direction; and
- a pair of bolts connecting said second ball joint to said lower arm of said yoke, said bolts extending through a corresponding one of a pair of horizontal slots formed in said lower arm and disposed on opposite sides of said cam member to thereby allow horizontal adjustment of said second ball joint forging relative to said other arm.

* * * * *